(12) United States Patent
Datta et al.

(10) Patent No.: US 8,683,191 B2
(45) Date of Patent: *Mar. 25, 2014

(54) RECONFIGURING A SECURE SYSTEM

(71) Applicant: Intel Corporation, Santa Clara, CA (US)

(72) Inventors: Sham M. Datta, Hillsboro, OR (US); Mohan J. Kumar, Aloha, OR (US); Ernie Brickell, Portland, OR (US); Ioannis T. Schoinas, Portland, OR (US); James A. Sutton, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/664,930

(22) Filed: Oct. 31, 2012

(65) Prior Publication Data

US 2013/0103938 A1 Apr. 25, 2013

Related U.S. Application Data

(63) Continuation of application No. 11/618,649, filed on Dec. 29, 2006, now Pat. No. 8,316,414.

(51) Int. Cl.
*G06F 9/48* (2006.01)

(52) U.S. Cl.
USPC .............. 713/100; 713/1; 713/2; 713/165; 713/320; 726/1; 726/22; 711/150; 711/151; 711/152; 711/163; 711/164

(58) Field of Classification Search
USPC ......... 713/1.2, 100, 165, 1, 2, 10, 320; 726/1, 726/22; 711/150–152, 163, 164
See application file for complete search history.

(56) References Cited

U.S. PATENT DOCUMENTS

| 5,615,263 | A | * | 3/1997 | Takahashi ..................... 713/164 |
| 5,748,888 | A | * | 5/1998 | Angelo et al. .................. 726/26 |
| 5,805,674 | A | * | 9/1998 | Anderson, Jr. ............. 379/93.03 |
| 5,920,850 | A | * | 7/1999 | Hunter et al. ................ 705/405 |
| 5,944,821 | A | | 8/1999 | Angelo |

(Continued)

FOREIGN PATENT DOCUMENTS

| JP | 07-287682 | | 10/1995 |
| JP | 2005-515517 | A | 5/2005 |
| JP | 2005-529401 | A | 9/2005 |
| KR | 20030094401 | A1 | 5/2003 |
| WO | 03104981 | A1 | 12/2003 |
| WO | 2008/082455 | A1 | 7/2008 |

OTHER PUBLICATIONS

Chinese Patent and Trademark Office, Office Action mailed Dec. 5, 2012 in Chinese application No. 200780048866.8.

(Continued)

*Primary Examiner* — Kambiz Zand
*Assistant Examiner* — Tongoc Tran
(74) *Attorney, Agent, or Firm* — Trop, Pruner & Hu, P.C.

(57) ABSTRACT

Apparatuses, methods, and systems for reconfiguring a secure system are disclosed. In one embodiment, an apparatus includes a configuration storage location, a lock, and lock override logic. The configuration storage location is to store information to configure the apparatus. The lock is to prevent writes to the configuration storage location. The lock override logic is to allow instructions executed from sub-operating mode code to override the lock.

20 Claims, 3 Drawing Sheets

(56) References Cited

U.S. PATENT DOCUMENTS

| | | | |
|---|---|---|---|
| 6,044,471 A * | 3/2000 | Colvin | 726/28 |
| 6,170,014 B1 * | 1/2001 | Darago et al. | 709/229 |
| 6,581,162 B1 * | 6/2003 | Angelo et al. | 713/193 |
| 6,662,020 B1 * | 12/2003 | Aaro et al. | 455/552.1 |
| 6,775,776 B1 * | 8/2004 | Vogt et al. | 713/186 |
| 6,823,451 B1 | 11/2004 | Gulick et al. | |
| 6,832,317 B1 | 12/2004 | Strongin et al. | |
| 6,862,641 B1 | 3/2005 | Strongin et al. | |
| 6,968,460 B1 | 11/2005 | Gulick | |
| 7,003,676 B1 | 2/2006 | Weber | |
| 7,007,300 B1 | 2/2006 | Weber et al. | |
| 7,024,639 B2 | 4/2006 | Teig et al. | |
| 7,043,581 B1 | 5/2006 | Gulick | |
| 7,065,654 B1 | 6/2006 | Gulick et al. | |
| 7,149,854 B2 | 12/2006 | Weber et al. | |
| 7,216,362 B1 | 5/2007 | Strongin et al. | |
| 2003/0028781 A1 | 2/2003 | Strongin | |
| 2003/0041248 A1 | 2/2003 | Weber et al. | |
| 2003/0229794 A1 | 12/2003 | Sutton, II et al. | |

OTHER PUBLICATIONS

Chinese Patent Office, Office Action mailed Apr. 17, 2012 in Chinese application No. 200780048866.8.

Office Action received for Japanese Patent Application No. 2009-544005, mailed on Apr. 19, 2011, 11 pages of Japanese Office Action including 6 pages of English Office Action.

International Preliminary Report on Patentability received for PCT Application No. PCT/US2007/024639, mailed on Jul. 9, 2009, 8 pages.

International Search Report and Written Opinion received for PCT Application No. PCT/US2007/024639, mailed on Mar. 31, 2008, 12 pages.

Office Action received for German Patent Application No. 112007003206.5, mailed on Dec. 22, 2010, 3 pages of English Translation and 3 pages of Office Action.

"PowerPC Embedded Processors Application Note—IBM Power PC™ 440 Microprocessor Core Programming Model Overview", Microcontroller Applications IBM Microelectronics, Version 1.0, Oct. 4, 2001, pp. 1-11.

* cited by examiner

RECONFIGURING A SECURE SYSTEM

This application is a continuation of U.S. patent application Ser. No. 11/618,649, filed Dec. 29, 2006, the content of which is hereby incorporated by reference.

BACKGROUND

1. Field

The present disclosure pertains to the field of information processing; more specifically, to secure information processing systems.

2. Description of Related Art

Information processing systems, such as those including a processor in the Intel® Pentium® Processor Family from Intel Corporation, may support operation in a secure system environment. A secure system environment may include a trusted partition and an un-trusted partition. The bare platform hardware of the system and trusted software may be included in the trusted partition. Direct access from the un-trusted partition to the resources of the trusted partition may be prevented to protect any secrets that the system may contain from being discovered or altered.

The bare platform hardware of the system may be included in the trusted partition through the execution of a secure system entry protocol. For example, an initiating processor may execute a secure enter instruction, to which all agents in the system must respond appropriately in order for the protocol to succeed. The responding agents may be required to not issue any instructions or process any transactions during the secure entry process, so that the initiating processor may validate a firmware module as authentic and trusted, execute the firmware module to configure the system to support trusted operations, and initiate the execution of a secure virtual machine monitor ("SVMM"). The SVMM may create one or more virtual machine environments in which to run trusted software, such that un-trusted software does not have direct access to system resources.

Generally, a system may not be reconfigured when operating in a secure system environment.

BRIEF DESCRIPTION OF THE DRAWINGS

The present invention is illustrated by way of example and not limitation in the accompanying figures.

DETAILED DESCRIPTION

Embodiments of the present invention in systems, apparatuses, and methods for reconfiguring a secure system are described. In the description, specific details such as processor and system configurations may set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention.

Embodiments of the present invention provide for reconfiguring an information processing system after it has entered a secure system environment. Such reconfiguration may be desired for purposes related to manageability, reliability, availability, and serviceability, or for any other purpose. For example, a secure system may be reconfigured to replace a malfunctioning or marginal processor core with a spare core.

Figure 1:
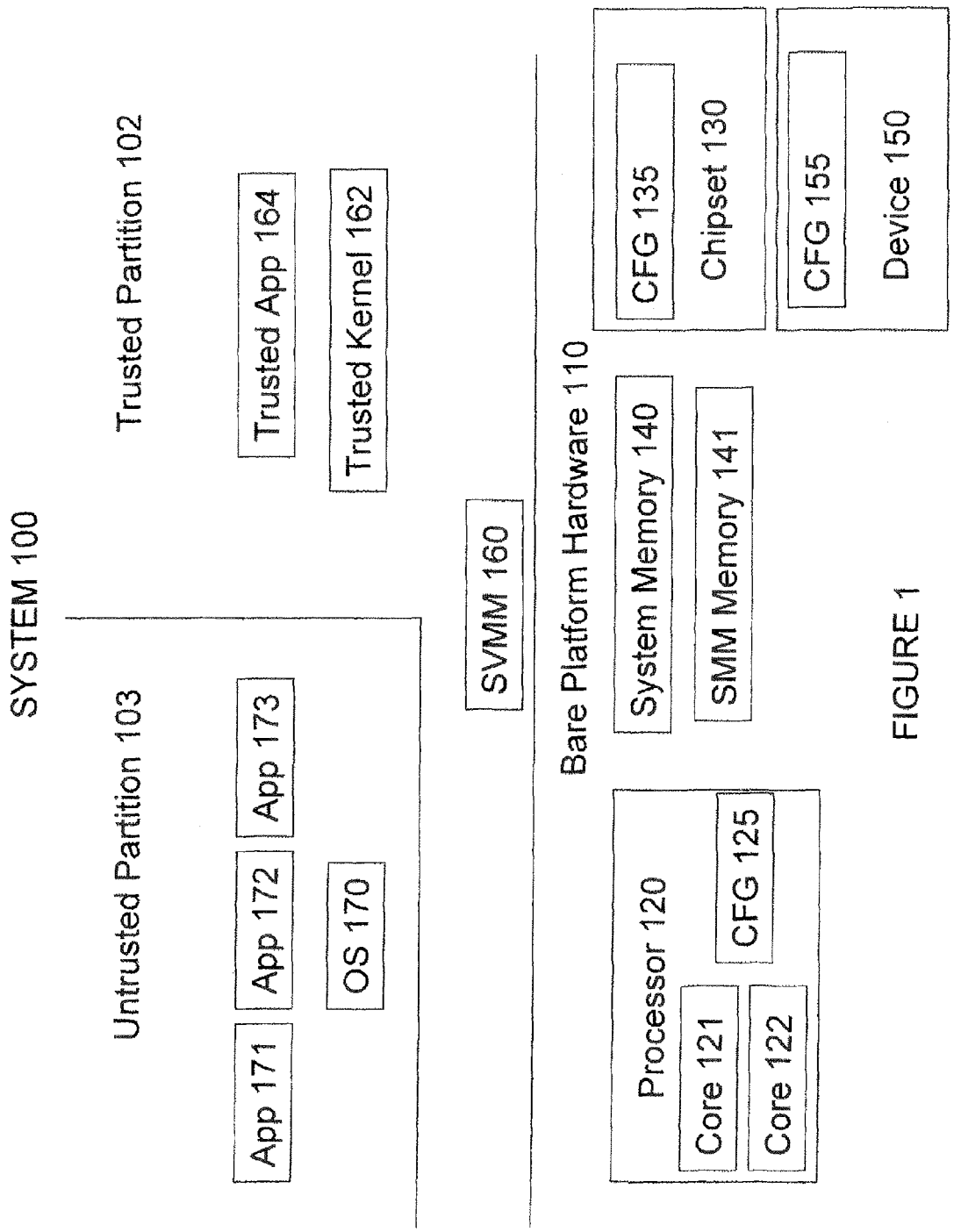
FIG. 1 illustrates an embodiment of the invention in an information processing system.

FIG. 1 illustrates an embodiment of the present invention in secure information processing system 100. Information processing system 100 may be personal computer a mainframe computer, a portable computer, a handheld device, a set-top box, a server, or any other computing system. In this embodiment, system 100 includes bare platform hardware 110, which in turn includes one or more processor packages 120, chipset(s) 130, system memory 140, system management mode ("SMM") memory 141, and device 150.

Processor 120 may be any component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a digital signal processor or microcontroller, or may be a reconfigurable core (e.g. a field programmable gate array. Although FIG. 1 shows only one such processor 120, system 100 may include any number of processors, including any number of multicore processors, each with any number of execution cores, and any number of multithreaded processors, each with any number of threads. In this embodiment, processor 120 includes cores 121 and 122.

Chipset 130 may be any group of circuits and logic that supports memory operations, input/output operations, configuration, control, internal or external interface, connection, or communications functions (e.g., "glue" logic and bus bridges), and/or any similar functions for processor 120 and/or system 100. Individual elements of chipset 130 may be grouped together on a single chip, a pair of chips, dispersed among multiple chips, and/or be integrated partially, totally, redundantly, or according to a distributed approach into one or more processors, including processor 120.

System memory 140 may be any medium on which information, such as data and/or program code, may be stored, such as static or dynamic random access memory, semiconductor-based read-only or flash memory, magnetic or optical disk memory, or any other type of medium readable by processor 120, or any combination of such mediums. SMM memory 141 may also be any such medium. SMM memory 141 and system memory 140 may be the same or different media, and may be fabricated, packaged, or other rise arranged as a single memory or two distinct memories.

Device 150 may represent any number of any type of I/O, peripheral, or other devices, such as a keyboard, mouse, trackball, pointing device, monitor, printer, media card, network interface, information storage device, etc. Device 150 may be embodied in a discrete component, or may be included in an integrated component with any other devices. In one embodiment, devices 150 may represent a single function in a multifunctional I/O, peripheral, or other device.

Processor 120, chipset 130, system memory 140, SMM memory 141, and device 150 may be coupled to or communicate with each other according to any known approach, such as directly or indirectly through one or more parallel, sequential, pipelined, asynchronous, synchronous, wired, wireless, or other bus or point-to-point connection. System 100 may also include any number of additional devices, agents, components, or connections.

System 100 is configured for secure operations according to any known approach. System 100 is divided into trusted partition 102 and un-trusted partition 103. Trusted partition 102 includes bare platform hardware 110, SVMM 160, trusted kernel 162, and trusted application 164. Un-trusted partition 103 includes operating system 170, and applications 171, 172, and 173. Each partition may also include additional processors, cores, portions of memory, devices, or any other physical resources described above or otherwise known in the art of information processing.

Processors 120, chipset 130, and device 150, include configuration units 125, 35, and 155, respectively. Configuration units 125, 135, and 155 provide for configurability of system 100, and reconfigurability when operating in a secure system environment as provided by embodiments of the present invention. Configuration units 125, 135, and 155 may be implemented according to a single approach, or different approaches.

Figure 2:
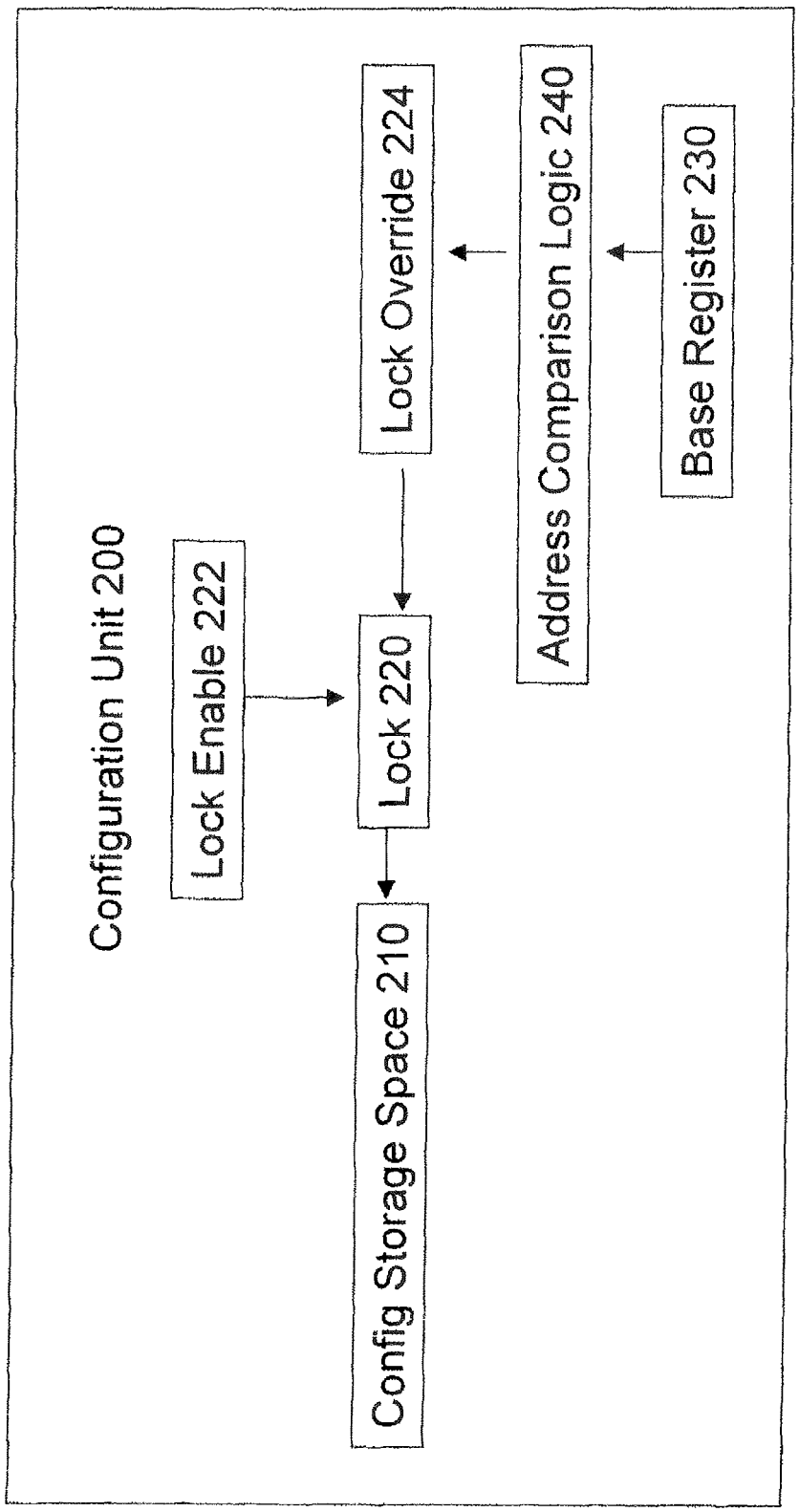
FIG. 2 illustrates a configuration unit according to one embodiment of the present invention.

FIG. 2 illustrates configuration unit 200 according to one embodiment of the present invention. Configuration unit 200 includes configuration storage space 210, lock 220, lock enable logic 222, lock override logic 224, base storage location 230, and address comparison logic 240. Configuration storage space 210 and base storage location 230 may include any register(s), portions of register(s) or any other location to store configuration information. Lock 220, lock enable logic 222, lock override logic 224, and address comparison logic 240 may be any implemented with any circuitry, logic, or other structure to perform the functions described below.

Configuration storage space 210 is to store information to configure a processor, chipset, device, or any other component in system 100. Lock 220 is to lock configuration storage space 210 such that the contents may not be changed, except as described in this specification.

Lock enable logic 222 is to enable lock 220, such that lock 220 is enabled and configuration storage space 210 is locked is response to lock enable logic 222 determining that a lock enable indicator is set, a lock signal is high, or some other condition under which lock 220 is to be enabled is true. The configuration of lock enable logic 222, which may include a lock enable control field, is not included in configuration storage space 220. Therefore, although the present invention provides for lock 220 to be overridden as described below, lock enable logic 272 cannot be reconfigured while lock 220 is enabled.

In one embodiment, lock enable logic is configured to enable lock 220 as part of the initiation of secure system operations, such that lock 220 is enabled during secure system operations.

Lock override logic 224 is to override lock 220, such that the contents of configuration storage space 210 may be changed, even if lock 220 is enabled, if lock override logic 224 determines that an override condition is true.

In one embodiment, lock 220 may perform a logical AND operation of two inputs. A first input may be a signal indicating that the override condition is true. The second input may be a configuration write signal. Then, the output of lock 220 may be used to enable a write to configuration storage space 210.

In one embodiment, the override condition may be that sub-operating system mode code is being executed. For the purpose of the present application such a mode may be defined as an operating mode having the ability to operate in an operating system transparent or quasi-transparent manner, or in a privilege-level independent manner, for the purpose of executing low-level patches, system management, power management, system reliability, system availability, and system serviceability, functions, or other similar functions. One such mode is the system management mode (SMM) of the Intel® Pentium® processor family and compatible processors. (See Chapter 14 of the Pentium® 4 Processor Software Developer's Manual, Vol. III, 2001 edition, order number 245472, available from Intel Corporation of Santa Clara, Calif.) Other sub operating system modes may exist in a MIPS Technologies® MIPS32® or MIPS64™ architecture processor, in an IBM® PowerPC™ architecture processor, in a SPARC International® SPARC® architecture processor, or in any number of other processors. Sub-operating system modes may be invoked by a dedicated sub-operating system mode interrupt, sometimes generated by system firmware or system hardware. This dedicated sub-operating system mode interrupt is usually designed to be non-maskable in order to respond to the exigencies that required the entry into the mode.

As mentioned above, one example of a sub-operating system mode is SMM, which is an operating environment that is parallel to the normal execution environment and may be used to perform special tasks such as system management, device management, power management, thermal management, reliability functions, availability functions, serviceability functions, etc. SMM is typically entered by asserting a system management interrupt pin and exited by executing a resume instruction. Since SMM is a separate operating environment, it has its own private memory space that must be protected from the normal execution environment. Although this private memory space is separate from regular system memory, it is mapped to an address region in regular system memory.

When entering the mode, the processor saves the context of the interrupted program or task within the separate SMM address space, e.g., SMM memory 141. During execution within the mode, normal interrupts may be disabled. Finally, the mode may be exited by means of a resume instruction that may only be executed while executing within the mode.

In an embodiment where the override condition is that sub-operating mode code is being executed, configuration unit 200 may include base storage location 230 and address comparison logic 240. Base storage location 230 is to store a base address. The base address is to specify a memory address region at which sub-operating system mode code is to be accessed (e.g., the "SMM region"). Base storage location 230 may be any field in any storage location. In one embodiment, base storage location 230 may be bits 31:12 of a 64-bit model-specific register (the "base system management range register" or "base SMRR"), to specify a 4K aligned base address.

Address comparison logic 240 is to compare an address associated with a configuration write transaction to the base address. The comparison may be performed according to any known approach, and may use a mask value from a mask storage location to mask selected bits of the comparison. The results from address comparison logic 240 may be used to determine whether the override condition is true. In one embodiment, address comparison logic 240 determines that the address corresponding to the storage location where the instruction generating the configuration write transaction is stored (e.g., using an instruction pointer) is within the SMM region, a signal indicating that the override condition is true is asserted.

Figure 3:
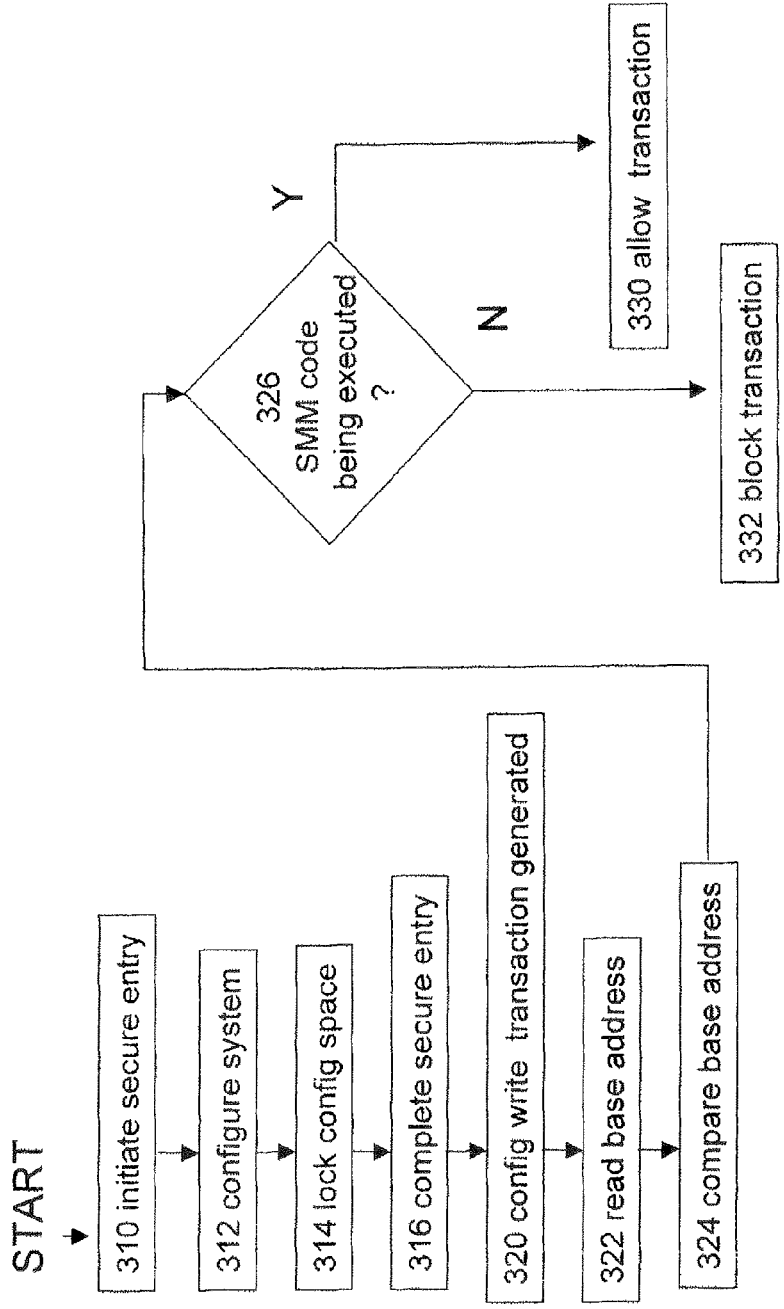
FIG. 3 illustrates an embodiment of the invention in a method for reconfiguring a secure system.

FIG. 3 illustrates an embodiment of the present invention in method 300, a method for reconfiguring a secure system. Although method embodiments are not limited in this respect, reference may be made to the description of FIGS. 1 and 2 to describe the method embodiment of FIG. 3.

In block 310, the entry of a system into a secure system environment is initiated. In block 312, the system is configured to operate in a secure system environment, by programming one or more configuration spaces in the system. In block 314, a lock is enabled to lock the configuration space(s). In block 316, the entry of the system into the secure system environment is completed and secure operations may begin.

In block 320, a configuration write transaction to a location within the configuration space is initiated. In block 322, an SMM base address is read from a based address storage location. In block 324, the address corresponding to the storage location where the instruction generating the configuration write transaction is stored is compared to the base address. In block 326, it is determined whether SMM mode code is being executed, e.g., based on the result of the comparison. If so, then in block 330, the configuration write transaction is allowed. If not, then in block 332, the configuration write transaction is blocked or aborted.

Within the scope of the present invention, it may be possible for method 300 to be performed in a different order, with illustrated block performed simultaneously, with illustrated blocks omitted, with additional blocks added, or with a combination of reordered, combined, omitted, or additional blocks.

Processor 120, or any other processor or component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, apparatuses, methods, and systems for reconfiguring a secure system have been disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores; and
   a configuration unit including:
      a configuration storage to store configuration information;
      a lock to lock the configuration storage;
      a lock enable logic to enable the lock during secure system operation in response to a lock enable indicator of a lock enable control field being of a first state, wherein the lock enable logic cannot be reconfigured while the lock is enabled;
      logic to determine whether an instruction that generates a configuration write transaction is from sub-operating mode code; and
      a lock override logic to override the lock to enable a write to the configuration storage during the secure system operation if the instruction that generates the configuration write transaction is from the sub-operating mode code.

2. The processor of claim 1, further comprising a base storage location to store a base address, where the base address is to specify a first memory address region at which the sub-operating mode code is to be accessed.

3. The processor of claim 1, wherein the sub-operating mode code is system management mode code, further comprising a base storage location to store a base address, where the base address is to specify a first memory address region at which the system management mode code is to be accessed.

4. The processor of claim 1, further comprising determination logic to determine whether the sub-operating mode code is being executed.

5. The processor of claim 1, wherein the sub-operating mode code is system management mode code, further comprising determination logic to determine whether system management mode code is being executed.

6. The processor of claim 5, further comprising address comparison logic to determine whether the system management code is being executed by comparison of an address associated with the instruction to a base address stored in a base storage location.

7. The processor of claim 1, wherein the write to the configuration storage is to cause a reconfiguration to replace a core with a spare core.

8. The processor of claim 7, wherein the replaced core comprises a malfunctioned core.

9. A method comprising:
   storing configuration information for a system in a configuration storage of a processor;
   enabling a lock with a lock enable logic of the processor to lock the configuration storage during secure system operation in response to a lock enable indicator being of a first state, wherein the lock enable logic cannot be reconfigured while the lock is enabled;
   determining whether an instruction that initiates a configuration write transaction is from sub-operating mode code; and
   overriding the lock to enable a write to the configuration storage during the secure system operation if the instruction is from the sub-operating mode code.

10. The method of claim 9, further comprising allowing the configuration write transaction in response to determining that the instruction is from the sub-operating mode code.

11. The method of claim 9, further comprising blocking the configuration write transaction in response to determining that the instruction is not from the sub-operating mode code.

12. The method of claim 9, further comprising entering a secure system environment before determining whether the instruction is from the sub-operating mode code.

13. The method of claim 9, further comprising comparing an address associated with the instruction to a base address to determine if the instruction is from the sub-operating mode code.

14. The method of claim 13, further comprising reading the base address from a base address storage location.

15. The method of claim 9, wherein the sub-operating mode is system management mode.

16. A system comprising:
   a processor including a plurality of cores and a configuration unit, the configuration unit including:
      a configuration storage to store information for the processor;
      a lock to lock the configuration storage;
      a lock enable logic including a lock enable field to store a lock enable indicator of a first state to enable the lock during secure system operation, wherein the lock enable logic cannot be reconfigured while the lock is enabled;
      logic to determine whether an instruction that generates a configuration write transaction is from sub-operating mode code;
      a lock override logic to override the lock if the logic determines that the instruction that generates the configuration write transaction is from the sub-operating mode code; and
   a dynamic random access memory to store the sub-operating mode code.

17. The system of claim 16, further comprising a chipset coupled to the processor, the chipset comprising:
   a second configuration storage to store information for the chipset;
   a second lock to lock the second configuration storage;
   a second lock enable logic including a lock enable field to store a lock enable indicator of a first state to enable the second lock during the secure system operation, wherein the second lock enable logic cannot be reconfigured while the second lock is enabled;
   second logic to determine whether an instruction that generates a configuration write transaction is from the sub-operating mode code; and
   a second lock override logic to override the second lock if the second logic determines that the instruction that generates the configuration write transaction is from the sub-operating mode code.

18. The system of claim 17, wherein the system comprises a trusted partition including the processor, a secure virtual machine monitor (SVMM), and a trusted kernel, and an untrusted partition including an untrusted kernel.

19. The system of claim 16, wherein the write to the configuration storage is to cause a reconfiguration to replace a core with a spare core.

20. The system of claim 19, wherein the replaced core comprises a malfunctioned core.

* * * * *